(12) United States Patent
Sperl et al.

(10) Patent No.: US 12,472,263 B2
(45) Date of Patent: Nov. 18, 2025

(54) OPHTHALMIC FORMULATION

(71) Applicant: PANOPTES PHARMA GES.M.B.H., Vienna (AT)

(72) Inventors: Stefan Sperl, Vienna (AT); Franz Obermayr, Vienna (AT)

(73) Assignee: PANOPTES PHARMA GES.M.B.H, Vienna (AT)

( * ) Notice: Subject to any disclaimer, the term of this patent is extended or adjusted under 35 U.S.C. 154(b) by 0 days.

(21) Appl. No.: 16/977,973

(22) PCT Filed: Mar. 8, 2019

(86) PCT No.: PCT/EP2019/055818
§ 371 (c)(1),
(2) Date: Sep. 3, 2020

(87) PCT Pub. No.: WO2019/170848
PCT Pub. Date: Sep. 12, 2019

(65) Prior Publication Data
US 2021/0052737 A1 Feb. 25, 2021

(30) Foreign Application Priority Data
Mar. 9, 2018 (EP) .................................... 18160981

(51) Int. Cl.
| | | |
|---|---|---|
| *A61K 38/00* | (2006.01) | |
| *A61K 9/00* | (2006.01) | |
| *A61K 9/06* | (2006.01) | |
| *A61K 31/381* | (2006.01) | |
| *A61K 47/64* | (2017.01) | |
| *A61P 27/02* | (2006.01) | |

(52) U.S. Cl.
CPC .......... *A61K 47/643* (2017.08); *A61K 9/0048* (2013.01); *A61K 9/06* (2013.01); *A61K 31/381* (2013.01); *A61P 27/02* (2018.01)

(58) Field of Classification Search
CPC ...... A61K 47/643; A61K 9/0048; A61K 9/06; A61K 31/381; A61K 31/4709; A61K 38/13; A61K 47/42; A61K 9/08; A61P 27/02
See application file for complete search history.

(56) References Cited

U.S. PATENT DOCUMENTS

| | | |
|---|---|---|
| 6,743,826 B1 | 6/2004 | Hegedus et al. |
| 7,365,094 B2 | 4/2008 | Leban et al. |
| 7,714,132 B2 | 5/2010 | Fecher et al. |
| 8,354,433 B2 | 1/2013 | Vitt et al. |
| 9,795,590 B2 | 10/2017 | Strobl |
| 11,730,716 B2 | 8/2023 | Sperl et al. |
| 12,209,073 B2 | 1/2025 | Sperl et al. |
| 2004/0176458 A1 | 9/2004 | Leban et al. |
| 2004/0192758 A1 | 9/2004 | Leban et al. |
| 2004/0254154 A1 | 12/2004 | Ashton |
| 2010/0280081 A1 | 11/2010 | Vitt et al. |
| 2011/0021465 A1 | 1/2011 | Minatelli et al. |
| 2011/0275603 A1 | 11/2011 | Muthuppalaniappan et al. |
| 2019/0025313 A1 | 1/2019 | Si et al. |
| 2023/0278979 A1 | 9/2023 | Sperl et al. |
| 2023/0285355 A1 | 9/2023 | Sperl et al. |

FOREIGN PATENT DOCUMENTS

| | | |
|---|---|---|
| EP | 0179477 A2 | 4/1986 |
| EP | 0 413 329 | 2/1991 |
| JP | 0834320 A1 * | 8/1998 |
| JP | 2006-089485 | 4/2006 |
| JP | 2009270356 A | 11/2009 |
| WO | 99/013914 A1 | 3/1999 |
| WO | WO 2003/006425 | 1/2003 |
| WO | 2004056747 A1 | 7/2004 |
| WO | 2004056797 A1 | 7/2004 |
| WO | WO 2004/056746 | 7/2004 |
| WO | WO 2006/022442 | 3/2006 |
| WO | WO 2007/038687 | 4/2007 |
| WO | WO 2008/077639 | 7/2008 |
| WO | WO 2009/021696 | 2/2009 |
| WO | WO 2010/128050 | 11/2010 |
| WO | WO 2011/138665 | 11/2011 |
| WO | WO 2015/154820 | 10/2015 |
| WO | 2015/169944 A1 | 11/2015 |
| WO | WO 2022/214691 | 10/2022 |

OTHER PUBLICATIONS

Shimmura et al., Albumin as a tear supplement in the treatment of sever dry eye, Br. J Ophthalmology 2003, 87: 1279-128 (Year: 2003).*
Schuerer et al., "Ocular toxicity and ocular tissue distribution of topically applied PP-001 in vivo," Abstract from the Annual Meeting of the Association for Research in Vision and Ophthalmology, Baltimore MD, May 7-11, 2017, Abstract published in BIOSIS as PREV201800654730, IOVS 58(8):503, Jun. 2017.
International Search Report and Written Opinion in PCT/EP2019/055818 issued May 29, 2019.
Yamasaki et al., Albumin-drug interaction and its clinical implication, Biochim Biophys Acta (BBA), 2013, 1830(12):5435-5443.
Berge et al., Jan. 1977, Pharmaceutical Salts, J. Pharm. Sci., 66(1):1-19.
Brittain, Dec. 1, 2009, Developing an appropriate salt form for an active pharmaceutical ingredient, American Pharmaceutical Review, 12(7):62-65.
CAS Registry No. 717142-73-9. Accessed Dec. 4, 2023, 2 pp.
Castiblanco et al., 2014, Review of systemic immunosuppression for autoimmune uveitis, Ophthalmol Ther, 3:17-36.

(Continued)

*Primary Examiner* — Jeanette M Lieb
(74) *Attorney, Agent, or Firm* — Knobbe, Martens, Olson & Bear, LLP (57) ABSTRACT

The present invention provides an ophthalmic composition comprising an active pharmaceutically compound non-covalently bound to albumin. The composition of the present invention is useful for treatment of ophthalmic diseases and disorders.

12 Claims, 5 Drawing Sheets

(56) References Cited

OTHER PUBLICATIONS

Chong et al., 2006, Concurrent Antiviral and Immunosuppresive Activities of Leflunomide In Vivo, Am. J. Transplant, 5(1):69-75.
Diedrichs-Mohring et al., 2018, Intraocular DHODH-inhibitor PP-001 suppresses relapsing experimental uveitis and cytokine production of human lymphocytes, but not of RPE cells J. of Neuroinflammation, 15(54):1-11.
European Agency for the Evaluation of Medicinal Products, Jan. 25, 2001, Note for Guidance on Plasma-Derived Medicinal Products, CPMP/BWP/265/95 rev. 3.
Fang et al., Apr. 2013, Amelioration of Experimental Autoimmune Uveitis by Leflunomide in Lewis Rats, PLoS ONE 8(4):e62071.
Hamrah et al., Apr. 2014, Impact of Corneal Pain on Quality of Life (QoL): The Ocular Pain Assessment Survey (OPAS) Study, ARVO Annual Meeting Abstract.
Kindsmuller et al., Sep. 2009, A 49-Kilodalton Isoform of the Adenovirus Type 5 Early Revion 1B 55-Kilodalton Protein Is Sufficient To Support Virus Replication, J. Viral. 83(18):9045-9056.
Klein, 2010, The use of biorelevant dissolution media to forecast the in vivo performance of a drug, The AAPS Journal, 12(3):397-406.
Kompella at el., 2011, Drug Product Development for the Back of the Eye, Springer, New York (TOC).
Marschall et al., 2012, In Vitro Evaluation of the Activies of the Novel Anticytomegalovirus Compound AIC246 letermovir) against Herpesviruses and other Human Pathogenic Viruses, Antimicrob. Agents Chemother. 56:1135-1137.
Marschall et al., 2013, Assessment of drug candidates for broad-spectrum antiviral therapy targeting cellular pyrimidine biosynthesis, Antiviral Research, 100(3):640-648 with supporting information.
Meister, 2005, Antiviral Mechanism(s) of the Experimental Immunosuppressive Agent Leflunomide Against Human Cytomegalovirus and Polyomavirus, doctoral dissertation, Ohio State University, 141 pp.
Qazi, et al. Jul. 2016, Validity and Reliability of a Novel Ocular Pain Assessment Survey in Quantification and Monitoring of Corneal and Ocular Surface Pain, Ophthalmology, 123(7), 1458-1468.
Peyman et al., 2009, Intravitreal injection of therapeutic agents, retrieved from internet: https://insights.ovid.com/pubmed?pmid=19584648, 1 p.
Suhler et al., Jul. 2018, Safety and Efficacy of Adalimumab in Patients with Noninfectious Uveitis in an Ongoing Open-Label Study: VISUAL III, Ophthalmology, 125(7):1075-1087.
Baumgartner et al., 2006, Dual Binding Mode of a Novel Series of DHODH Inhibitors Journal of Medicinal Chemistry, 49(4):1239-1247.
Davis et al., 1996, The Immunosuppressive Metabolite of Leflunomide is a Potent Inhibitor of Human Dihydroorotate Dehydrogenase, Biochemistry, 35(4):1270-1273.
Leban et al., 2006, Biphenyl-4-ylcarbamoyl thiophene carboxylic acids as potent DHODH inhibitors, Bioorg Med Chem cell., 16(2):267-270.
Ozdemir et al., Jun. 14, 2022, Patient Medication Preferences for Managing Dry Eye Disease: the Importance of Medication Side Effects, Patient, 15:679-690.
Rechter et al., 2006, Antiviral activity of Arthrospira-derived spirulan-like substances, Antiviral Res. 72:197-206.
Sung et al., 1999, Intravitreal controlled release implant for leflunomide: Potential treatment for uveitis, Proceedings of he International Symposium on Controlled Release of Bioactive Materials, 26:38-39.
U.S. Department of Health and Human Services, Food and Drug Administration, Center for Drug Evaluation and Research (CDER), Dec. 14, 2020, Dry Eye: Developing Drugs for Treatment Guidance for Industry, Draft Guidance.
Yeh et al., 2019, Suprachoroidal injection of triamcinolone acetonide, CLS-TA, for macular edema due to noninfectious uveitis, Retina 39(10):1880-1888.

* cited by examiner

OPHTHALMIC FORMULATION

FIELD OF THE INVENTION

The present invention relates to ophthalmic composition comprising a pharmaceutically active compound non-covalently bound to albumin. The composition of the present invention is useful for treatment of ophthalmic diseases and disorders.

Background Art

Many eye diseases have no early symptoms. They may be painless, and no change in vision until the disease has become quite advanced may be perceived.

Dry eye disease occurs when there is reduced tear production or when tears evaporate too quickly due to a decrease in tear quality. Without sufficient lubrication the eyes become dry, with symptoms of grittiness, dryness, burning, redness or excessive tears.

Along with its needed effects, ocular lubricant ophthalmic may cause some unwanted effects. Although not all of these side effects may occur if they do they may need medical attention. More or less common side effects are blurred vision, eye redness or discomfort or other irritation not present before use of this medicine, increased sensitivity of eyes to light, matting or stickiness of eyelashes, and watering of eyes.

There are many over-the-counter and prescription drugs that can help with dry eyes. For the present, in order to treat the dry eye, an artificial tear solution for the purpose of replenishing tear, and chondroitin sulfate, glutathione, hyaluronic acid, fibronectin, Epidermal Growth Factor (EGF), and the like for the purpose of relieving subjective symptoms are administered, but the effects are not yet sufficient.

EP0834320A1 discloses a pharmaceutical composition for treatment of corneal and conjunctival lesion, and dry eye comprising albumin as single active ingredient.

EP0981375A1 relates to pharmaceutical compositions containing therapeutically active compounds non-covalently bound to a plasma protein for parenteral administration. According to EP0981375A1 the therapeutically active compound is dissolved in a water-miscible, pharmaceutically acceptable organic solvent, then combined with an aqueous solution of the plasma protein and finally the organic solvent is removed.

EP0179477 discloses a fibronectin preparation with improved water solubility wherein small amounts of albumin are used as stabilizer.

However, there is still the need for effective and well tolerated ophthalmic medication.

SUMMARY OF INVENTION

It is the objective of the invention to provide an ophthalmic formulation which is effective and well tolerated.

The objective is solved by the subject matter as claimed and further described herein.

The present invention relates to a formulation comprising a pharmaceutically active compound non-covalently bound to albumin.

One embodiment of the invention relates to an ophthalmic composition comprising a pharmaceutically active compound and albumin, wherein the aqueous solubility of the pharmaceutically active compound is increased by at least 10% in the presence of albumin when compared to the aqueous solubility of the pharmaceutically active compound alone.

One embodiment of the invention relates to an ophthalmic composition comprising an ophthalmic drug and albumin.

One embodiment of the invention relates to an ophthalmic composition comprising a pharmaceutically active compound and albumin, wherein the aqueous solubility of the pharmaceutically active compound is increased by at least 10% in the presence of albumin when compared to the aqueous solubility of the pharmaceutically active compound alone, and/or the tolerability of the pharmaceutically active compound is increased when compared to the tolerability of the pharmaceutically active compound alone.

A further embodiment of the invention relates to the ophthalmic composition as described herein, wherein at least 50% of the pharmaceutically active compound are non-covalently bound to albumin.

A further embodiment of the invention relates to the ophthalmic composition as described herein, wherein the albumin is human serum albumin, recombinant human serum albumin, serum albumin that has at least a one amino acid truncation at its N-terminal end, or prealbumin.

One embodiment of the invention relates to the ophthalmic composition as described herein, wherein the pharmaceutically active compound is selected from the group consisting of ocular allergy drugs, antibiotic agents, dry eye therapy agents, non-steroidal drugs, corticosteroid drugs, glaucoma care drugs, shingles therapy drugs, preferably the active compound is lifitegrast, cyclosporine A, or 3-(2,3,5,6-tetrafluoro-3'-trifluoromethoxy-biphenyl-4-ylcarbamoyl)-thiophene-2-carboxylic acid (PP-001).

One embodiment of the invention provides an ophthalmic composition comprising an ophthalmic drug selected from one of the following groups: alpha adrenergic agonists, beta blockers, carbonic anhydrase inhibitors, prostaglandin analogues, cholinergic agonists, non-steroidal anti-inflammatory drugs and steroidal anti-inflammatory drugs, and albumin.

Another embodiment of the invention provides an ophthalmic composition comprising a carbonic anhydrase inhibitor selected from dorzolamide and brinzolamide, and albumin.

Another embodiment of the invention provides an ophthalmic composition comprising a beta blocker selected from timolol, carteolol, betaxolol, levobunolol or metipranolol, preferably timolol and levobunolol, and albumin.

Another embodiment of the invention provides an ophthalmic composition comprising an alpha-adrenergic agonist selected from brimonidine, apraclonidine, epinephrine and dipivefrin, and albumin.

Another embodiment of the invention provides an ophthalmic composition comprising intra-ocular pressure reducing compounds like netarsudil mesylate or a prostaglandin analogue selected from bimatoprost, latanoprost, travoprost, unoprostone isopropyl and tafluprost, and albumin.

Another embodiment of the invention provides an ophthalmic composition comprising a cholinergic agonist selected from pilocarpin, carbacol and echothiophate, and albumin.

Another embodiment of the invention provides an ophthalmic composition comprising a non-steroidal anti-inflammatory drug selected from bromfenac, diclofenac, flurbiprofen, ketorolac, nepafenac, naproxen, ketoprofen and lifitegrast, and albumin.

Another embodiment of the invention provides an ophthalmic composition comprising a steroidal anti-inflammatory drug selected from dexamethasone, difluprednate, loteprednol, fluocinolone acetonide, triamcinolone acetonide, budesonide, rimexolone, prednisolone, and fluorometholone and albumin.

Another embodiment of the invention provides an ophthalmic composition comprising a histamine antagonist drug selected from azelastine, levocabastine, olopatadine and epinastine, and albumin.

Another embodiment of the invention provides an ophthalmic composition comprising an antibiotic drug selected from chloramphenicol, ciprofloxacin, framycetin, fusidic acid, gentamicin, gramicidin, lomefloxacin, neomycin, ofloxacin, polymyxin B, propamidine isethionate, besifloxacin, gatifloxacin, moxifloxacin, azithromycin, erythromycin, tobramycin, vancomycin, cefazolin, ceftazidime, amikacin, bacitracin, cefuroxime, doxycycline, tetracycline, metronidazole and trimethoprim, and albumin.

Another embodiment of the invention provides an ophthalmic composition comprising an immune-suppressive drug selected from cyclosporine A and methotrexate, and albumin.

A further embodiment of the invention relates to the ophthalmic composition as described herein, further comprising one or more pharmaceutically acceptable excipients and/or carriers.

A further embodiment of the invention relates to the ophthalmic composition as described herein, wherein the pharmaceutically acceptable excipient is selected from the group consisting of surfactants, preservatives, viscosity regulators, pH-adjusting agents, stabilizers, and tonicity-regulators.

A further embodiment of the invention relates to the ophthalmic composition as described herein, wherein the pharmaceutically active compound is comprised from 0.005% to 20%, or 0.01% to 10%, or 0.05% to 5% by weight. In one embodiment of the invention PP-001 is comprised from 0.05% to 10%, or from 0.05% to 5%, or from 0.05% to 3%, or from 0.05% to 2%, or from 0.05% to 1% by weight.

A further embodiment of the invention relates to the ophthalmic composition as described herein, wherein albumin is comprised from about 1% to about 30% by weight.

A further embodiment of the invention relates to the ophthalmic composition as described herein, wherein the weight ratio of albumin to the pharmaceutically active compound in the ophthalmic composition is about 1:5, or 1:3, or 1:2, or 1:1, or 2:1, or 3:1, or 5:1, or 20:1, or 400:1, or more. In one embodiment of the invention the ratio of albumin to PP-001 in the ophthalmic composition is about 1:1, or 20:1, or 400:1, or more.

A further embodiment of the invention relates to the ophthalmic composition as described herein, which is for topical ocular instillation.

A further embodiment of the invention relates to the ophthalmic composition as described herein, in the form of eye drops, gel, ointment or spray.

A further embodiment of the invention relates to the ophthalmic composition as described herein, for use in the treatment of a patient suffering from a dry eye syndrome, post-cataract surgery, glaucoma, conjunctivitis, allergy, bacterial infection, blepharitis, infectious corneal ulcers, corneal abrasions, ocular inflammation, corneal transplants, and uveitis.

A further embodiment of the invention relates to the ophthalmic composition for use as described herein, wherein the dry eye syndrome is aqueous tear-deficient dry eye or evaporative dry eye.

A further embodiment of the invention relates to the ophthalmic composition for use as described herein, wherein the dry eye syndrome is selected from the group consisting of alacrima, xerophthalmia, Sjogren syndrome, dry keratoconjunctivitis, Stevens-Johnson syndrome, ocular pemphigoid, dry eye after ophthalmic operation, dry eye accompanied with allergic conjunctivitis, dry eye like conditions including tear decrement of VDT (Visual Display Terminal) worker and tear decrement without any systemic symptom caused by dry room due to air conditioning.

One embodiment of the invention relates to an ophthalmic composition comprising 3-(2,3,5,6-tetrafluoro-3'-trifluoromethoxy-biphenyl-4-ylcarbamoyl)-thiophene-2-carboxylic acid (PP-001) as pharmaceutically active compound non-covalently bound to human serum albumin.

DESCRIPTION OF EMBODIMENTS

The therapeutic efficiency of a drug is dependent on the availability of the drug at the target site at a concentration and frequency that maximizes the therapeutic action and minimizes side-effects to the patient. In order to maximize the therapeutic effect a drug carrier may be used. A drug carrier may be any substrate used in the process of drug delivery which serves to improve the selectivity, effectiveness, and/or safety of drug administration.

The natural transport function, multiple ligand binding sites, and cellular interactions of albumin provides rational for the exploitation of albumin for drug delivery. The ability to covalent and non-covalently attach drugs or expression of albumin-drug fusions provides a range of design options that has been taken into clinical trials or even on the market.

There are several advantages of using albumin as drug carrier:
1) As an endogenous protein, human serum albumin (HSA) is native to the body. It is biodegradable in nature, nontoxic and non-immunogenic;
2) Albumin is a robust protein. It is stable over a wide pH range 4-9, could be heated at 60° C. for up to 10 hours without deleterious effect, is unaltered by denaturing agents and solvents at moderate concentrations.

Most of the commercially available eye drops induce burning and stinging sensation. To overcome the adverse effects of the eye drops, several solutions were already investigated. In literature it is mentioned, that exchanging phosphate buffer with borate buffer and/or addition of caffeine could increase tolerability of eye drops. However, in our trials this led just to a minor improvement. Further, attempts to use cyclodextrins or micelle forming excipients also could not solve the problem satisfactorily.

During the development of drugs for local delivery, it may be advantageous to have novel forms of such drug materials that possess improved properties, including increased aqueous solubility and stability. It is also desirable in general to increase the dissolution rate of such solid forms, and potentially increase their bioavailability. This also applies to the development of novel forms of ophthalmic drug compounds.

The inventors surprisingly have found that an ophthalmic composition comprising a pharmaceutically active compound and albumin, increases the aqueous solubility of the pharmaceutically active compound and/or the tolerability of the pharmaceutically active compound compared to the aqueous solubility or the tolerability of the pharmaceutically active compound alone.

One embodiment of the invention relates to an ophthalmic composition comprising a pharmaceutically active compound and albumin, wherein the aqueous solubility of the pharmaceutically active compound is increased by at least 10% in the presence of albumin when compared to the aqueous solubility of the pharmaceutically active compound alone. Further embodiments of the invention relates to an increase of solubility of the pharmaceutically active compound of at least 20%, 25%, 50%, 75%, 100%, or even more.

General ophthalmic solutions may contain for example edetate disodium, methylsulfonylmethane (MSM), mitomycin, or dexamethasone. Antifungal ophthalmic preparations are for example ophthalmic preparations comprising clotrimazole, amphotericin, fluconazole, voriconazole, or miconazole nitrate as solution, ointment of suspension. Medications for dry eyes are for example ophthalmic preparations comprising albumin as the sole active ingredient, cyclosporine (trade name Restasis (in the USA) and Ikervis (in the EU)), tacrolimus, retinoic acid, or carosine as solution or ointment. Antibiotic ophthalmic preparations are for example preparations comprising chloramphenicol, ciprofloxacin, framycetin, fusidic acid, gentamicin, gramicidin, lomefloxacin, neomycin, ofloxacin, polymyxin B, propamidine isethionate, moxifloxacin, tobramycin, vancomycin, cefazolin, ceftazidime, amikacin, cefuroxime, doxycycline, tetracycline, metronidazole or trimethoprimas active ingredient.

Lifitegrast (trade name Xiidra) is an FDA approved drug indicated for the treatment of signs and symptoms of dry eye, a syndrome called keratoconjunctivitis sicca. Lifitegrast reduces inflammation by inhibiting inflammatory cell binding. Common side effects in clinical trials were eye irritation, discomfort, blurred vision, and dysgeusia (a distortion of the sense of taste).

Restasis eye drops contain cyclosporine which is an immunosuppressant. Cyclosporine can increase tear production that has been reduced by inflammation in the eye(s). Restasis eye drops are used to treat chronic dry eye that may be caused by inflammation. The most common side effect of Restasis is a temporary burning sensation in the eye. Due to the low aqueous solubility of cyclosporine, Restasis is formulated as cyclosporine suspension. For the same reason, Ikervis contains cyclosporine as emulsion.

Some active compounds are currently under development, which also may have beneficial effects in the treatment of ophthalmic diseases, e.g. 3-(2,3,5,6-tetrafluoro-3'-trifluoromethoxy-biphenyl-4-ylcarbamoyl)-thiophene-2-carboxylic acid (PP-001) (WO2015/169944). However, PP-001 has a low aqueous solubility (0.8 mg/mL in phosphate buffer pH 7.4).

PP-001 (3-(2,3,5,6-tetrafluoro-3'-trifluoromethoxy-biphenyl-4-ylcarbamoyl)-thiophene-2-carboxylic acid) possesses pronounced antiviral activity. PP-001 showed in vivo efficacy to treat uveitis. In two different rat models for uveitis, PP-001 completely ameliorates clinical and histological symptoms of the disease. In addition, a therapeutic approach with PP-001 prevents relapses of experimental autoimmune uveitis.

The inventors surprisingly found that PP-001 and other ophthalmic compounds bind reversible to albumin and they envisaged that this novel formulation could reduce the burning and stinging effect of the drugs. Further, binding to albumin could increase the poor aqueous solubility of said compounds. In addition, human serum albumin is a natural human protein and component of tear fluid. Furthermore, albumin containing solutions were already used as artificial tears (similarly to cellulose derivatives HPMC or CMC) to moisturize eyes of dry eye patients.

Human serum albumin, which is purified to the purity suitable for using normally in medical applications, can preferably be used in the present invention without any particular problem. That is, those containing not less than 80% of albumin (in case of analyzing with the electrophoresis) are preferred. In order to inactivate virus, etc., those obtained by heat-treating are preferred. Particularly, human serum albumin, which is commercially available as a drug, is preferably used. Alternatively, albumin produced by microorganism obtained by gene recombination may also be used.

The origin of albumin used for the formulation of the present invention is not specifically limited. Human origin albumin, e.g. human serum albumin is preferably used.

The pharmaceutical composition of the present invention may be in a dosage form such as tablets, pills, powders, suspensions, capsules, suppositories, injection preparations, ointments, eye drops, and the like. It is particularly preferred to locally administer eye drops. Depending on the formulation auxiliary excipients may be present in the pharmaceutical composition.

The phrase "pharmaceutically acceptable" as used herein refers to those ligands, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

A "pharmaceutically acceptable salt" as used herein includes a salt with an inorganic base, organic base, inorganic acid, organic acid, or basic or acidic amino acid. Salts of inorganic bases include, for example, alkali metals such as sodium or potassium; alkaline earth metals such as calcium and magnesium or aluminum; and ammonia. Salts of organic bases include, for example, trimethylamine, triethylamine, pyridine, picoline, ethanolamine, diethanolamine, and triethanolamine. Salts of inorganic acids include for example, hydrochloric acid, hydroboric acid, nitric acid, sulfuric acid, and phosphoric acid. Salts of organic acids include for example, formic acid, acetic acid, trifluoroacetic acid, fumaric acid, oxalic acid, tartaric acid, maleic acid, citric acid, succinic acid, malic acid, methanesulfonic acid, benzenesulfonic acid, and p-toluenesulfonic acid. Salts of basic amino acids include, for example, arginine, lysine and ornithine. Acidic amino acids include, for example, aspartic acid and glutamic acid.

The term "pharmaceutically acceptable carrier" as used herein means a pharmaceutically acceptable material, composition, or vehicle, such as a liquid or solid filler, diluent, excipient, solvent or encapsulating material. As used herein the language "pharmaceutically acceptable carrier" includes buffer, sterile water for injection, solvents, dispersion media, coatings, antibacterial and antifungal agents, isotonic and absorption delaying agents, and the like, compatible with pharmaceutical administration. Each carrier must be "acceptable" in the sense of being compatible with the other ingredients of the formulation and not injurious to the patient.

As used herein, the terms "ocular disease," "ocular condition," "eye disease," and "eye condition" refer to diseases/conditions of the eye(s) that can be sight threatening, lead to eye discomfort, and may signal systemic health problems.

The eye surface is composed of the cornea, conjunctiva, eyelids, lacrimal and meibomian glands, and the interconnecting nerves. As used herein, the term "anterior segment disease" refers to all disorders that affect the eye surface, eye lid, conjunctiva, anterior chamber, iris and ciliary body and lens of the eye.

As used herein, the terms "posterior segment eye disease" and "back-of-the-eye disease" refer to all disorders that affect the posterior segment of the eye. A posterior eye disease is a disease which primarily affects a posterior ocular site such as choroid or sclera, vitreous, vitreous chamber, retina, optic nerve, and blood vessels and nerves which vascularize or innervate a posterior ocular site.

Accordingly, in one aspect, provided is a method treating or preventing an ocular disease or condition that includes locally administering a formulation as described herein. In some embodiments, the ocular disease is an anterior segment disease. In some embodiments, the ocular disease is one or more selected from the group consisting of dry eye syndrome, Sjogren's syndrome, uveitis, anterior uveitis (iritis), chorioretinitis, conjunctivitis, allergic conjunctivitis, keratitis, keratoconjunctivitis, vernal keratoconjunctivitis (VKC), atopic keratoconjunctivitis, systemic immune mediated diseases such as cicatrizing conjunctivitis and other autoimmune disorders of the ocular surface, blepharitis, scleritis, bacterial infection, infectious corneal ulcers, corneal abrasions, ocular inflammation, corneal transplants, and uveitis.

In one embodiment, the ocular disease is dry eye. In one embodiment, the ocular disease is allergic conjunctivitis. In one embodiment, the ocular disease is viral conjunctivitis.

As used herein, the term "dry eye" includes not only simple dry eye (tear decrement) defined as "a condition with decrease or change in quality of tear, irrespective of the presence or absence of corneal and conjunctival lesion" but also various dry eye condition such as alacrima, xerophthalmia, Sjogren syndrome, dry keratoconjunctivitis, Stevens Johnson syndrome and ocular pemphigoid, blepharitis.

Further, the term "dry eye" includes dry eye after cataract surgery and that accompanied with allergic conjunctivitis, as well as dry eye like condition such as a tear decrement of VDT (Visual Display Terminal) worker and a tear decrement without any systemic symptom caused by, for example, dry room due to air conditioning.

As used herein, the term "treatment" or "treating" refers to any means of control of the conditions, including prevention, cure and relief of the conditions and arrestation or relief of development of the condition.

An aspect of the present disclosure is directed toward non-covalently bound complexes of a compound as described herein, or a pharmaceutically acceptable salt thereof, and serum albumin.

In some embodiments, the non-covalently bound complex of a compound as described herein and serum albumin has a weight ratio of albumin to compound from about 1:1 to about 400:1. In some embodiments, the weight ratio has a range from about 1:1 to about 300:1, from about 1:1 to about 200:1, from about 1:1 to about 100:1, about 1:1 to about 50:1, from about 1:1 to about 45:1, from about 1:1 to about 40:1, from about 1:1 to about 35:1, from about 1:1 to about 30:1, from about 1:1 to about 25:1, from about 1:1 to about 20:1, from about 1:1 to about 15:1, from about 1:1 to about 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, or from about 1:1 to about 2:1. In some embodiments, the weight ratio is less than about 1:2, 1:3, 1:4, 1:5, 1:6, 1:7, 1:8, 1:9, 1:10, 1:15, or 1:20.

In some embodiments, the non-covalently bound complex of a pharmaceutically active compound and serum albumin as described herein is in a solid formulation. The solid formulation typically has been produced in a uniform manner by lyophilization. A skilled artisan would recognize other methods, such as rotary evaporation, that can also produce solid formulations.

In some embodiments, the non-covalently bound complex of a pharmaceutically active compound and serum albumin as described herein is in an aqueous formulation. In some embodiments, the non-covalently bound complex of the compound and serum albumin is in an aqueous formulation substantially free of solvents other than water. In some embodiments, the non-covalently bound complex of the pharmaceutically active compound and serum albumin is in an aqueous solution that contains less than about 0.5%, 0.3%, 0.2%, 0.1%, 0.075%, 0.05%, 0.03%, 0.02%, 0.01%, 0.0075%, 0.005%, 0.003%, 0.002%, or 0.001% by weight, of any non-water solvent. In some embodiments, the non-covalently bound complex of the compound and serum albumin is in an aqueous formulation free of solvents other than water.

The non-covalently bound complex of a pharmaceutically active compound as described herein and serum albumin has greatly enhanced solubility compared with said compound alone.

As used herein, "solubility in aqueous solution of at least X mg/mL" refers to thermodynamic solubility of a compound in an aqueous 50 mM phosphate buffer or phosphate buffered saline (PBS) solution at pH 7.4 at least X mg/mL. PP-001 has a solubility of 0.8 mg/mL in an aqueous phosphate buffer solution at pH 7.4. However, if the aqueous buffer solution comprises 5% albumin PP-001 has solubility of at least 5 mg/mL.

A pharmaceutical composition may also contain adjuvants such as preservatives, wetting agents, emulsifying agents, and dispersing agents. Prevention of the action of microorganisms may be ensured by the inclusion of various antibacterial and antifungal agents, for example, paraben, chlorobutanol, phenol sorbic acid, and the like. It may also be desirable to include tonicity-adjusting agents, such as sugars and the like into the compositions. In addition, prolonged absorption of the injectable pharmaceutical form may be brought about by the inclusion of agents which delay absorption such as aluminum monostearate and gelatin.

In case of the composition of the present invention is formulated as eye drops, the composition may contain the active pharmaceutical compound in an amount of about 0.5 mg/mL, or 3.0 mg/mL, or 5.0 mg/mL, or 10.0 mg/mL.

Ophthalmic drugs are drugs used to treat, prevent or diagnose a disease or disorder of the eyes. Non-limiting examples of ophthalmic drugs include ocular allergy drugs, antibiotic agents, dry eye therapy, non-steroidal drugs, corticosteroid drugs, glaucoma care drugs, shingles therapy drugs, alpha adrenergic agonists, beta blockers, carbonic anhydrase inhibitors, prostaglandin analogues, cholinergic agonists, and combinations thereof.

Representative ocular allergy agents include, but are not limited to, ketorolac, ketotifen, loteprednol, bepotastine, epinastine, emedastine, alcaftadine, azelastine, olopatadine, olopatadine, nedocromil, lodoxamide, cromolyn, levocabastine and pharmaceutically acceptable salts thereof, and/or combinations thereof.

Representative ocular antibiotic agents include, but are not limited to, chloramphenicol, ciprofloxacin, framycetin, fusidic acid, gentamicin, gramicidin, lomefloxacin, neomycin, ofloxacin, polymyxin B, propamidine isethionate, besifloxacin, gatifloxacin, moxifloxacin, azithromycin, erythromycin, tobramycin, vancomycin, cefazolin, ceftazidime, amikacin, bacitracin, cefuroxime, doxycycline, tetracycline, metronidazole and trimethoprim, and pharmaceutically acceptable salts thereof, and/or combinations thereof.

Representative dry eye therapy includes artificial tears, such as for example castor oil, glycerol, mineral oil, and light mineral oil.

Representative ocular non-steroidal agents include, but are not limited to, bromfenac, diclofenac, flurbiprofen, ketorolac, nepafenac, naproxen, ketoprofen and lifitegrast, and pharmaceutically acceptable salts thereof, and/or combinations thereof.

Representative ocular corticosteroid agents include, but are not limited to, dexamethasone, difluprednate, loteprednol, fluocinolone acetonide, triamcinolone acetonide, budesonide, rimexolone, prednisolone, and fluorometholone, and pharmaceutically acceptable salts thereof, and/or combinations thereof.

Representative ocular topical glaucoma agents include, but are not limited to, levobunolol, timolol, betaxolol, bimatoprost, travoprost, latanoprost, tafluprost, brimonidine, brinzolamide, dorzolamide, and pharmaceutically acceptable salts thereof, and/or combinations thereof.

In one embodiment the active pharmaceutical compound is selected from the group consisting of ocular allergy drugs, antibiotic agents, dry eye therapy agents, non-steroidal drugs, corticosteroid drugs, glaucoma care drugs, shingles therapy drugs. A further embodiment of the invention relates to PP-001, lifitegrast, cyclosporine A, azelastine HCl, bimatoprost, brinzolamide, dipivefrin HCl, fusidic acid, levocabastine, nepafenac, netarsudil mesylate, prednisolone acetate as active pharmaceutical compound.

In case of the composition of the present invention is formulated as eye drops, the composition may contain albumin in an amount of about 1 to 300 mg/mL, or of about 10 to 200 mg/mL, or of about 50 to 100 mg/mL. The composition may further contain a pharmaceutically acceptable diluent.

As used herein, the "pharmaceutically acceptable diluent" may be any diluent which is used for ophthalmic composition known to persons skilled in the art, for example, water, physiological saline, artificial tear solution, or the like.

The pharmaceutical composition of the present invention may further comprise various components that are used in a normal ophthalmic composition, such as stabilizers, sterilizers, buffering agents, tonicity modifiers, chelating agents, pH adjusters, surfactants, or the like.

Pharmaceutical compositions typically include a pharmaceutically acceptable carrier. Some examples of materials which can serve as pharmaceutically acceptable carriers include: (1) sugars, such as lactose, glucose, and sucrose; (2) starches, such as corn starch, potato starch, and substituted or unsubstituted β-cyclodextrin; (3) cellulose, and its derivatives, such as sodium carboxymethyl cellulose, ethyl cellulose, and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil, and soybean oil; (10) glycols, such as propylene glycol; (11) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations. In certain embodiments, pharmaceutical compositions provided herein are non-pyrogenic, i.e., do not induce significant temperature elevations when administered to a patient.

Examples of pharmaceutically acceptable antioxidants include: (1) water soluble antioxidants, such as ascorbic acid, cysteine hydrochloride, sodium bisulfate, sodium metabisulfite, sodium sulfite, and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal chelating agents, such as citric acid, ethylenediamine tetraacetic acid (EDTA), sorbitol, tartaric acid, phosphoric acid, and the like.

Examples of the stabilizer include normal L-type amino acids such as glycine and alanine, and the like, monosaccharides such as glucose and mannose, and the like, disaccharides such as sucrose and maltose, and the like, sugar alcohols such as mannitol and xylitol, and the like, and polysaccharides such as dextran, and the like.

Examples of the sterilizer include benzalkonium salt, chlorhexidine salt and ester of paraoxybenzoate, or the like.

Examples of the buffering agent include boric acid, phosphoric acid, acetic acid, and citric acid or a salt thereof.

Examples of the isotonic agent include sodium chloride, potassium chloride and saccharides, or the like.

Examples of the chelating agent include sodium edetate and citric acid, or the like.

Since it is an ophthalmic formulation, pH is preferably in the range of 5 to 8. The pH of the ophthalmic formulation is for example 5.0, 5.5, 6.0, 6.5, 7.0, 7.1, 7.2, 7.3, 7.4, 7.5, 7.6, 7.7, 7.8, 7.9, or 8.0.

In one embodiment of the present invention, the ophthalmic formulation comprising the active pharmaceutically compound and albumin may be administered as the pharmaceutical composition of the present invention. The administration route is not limited but topical administration to eye is most preferable.

In one embodiment of the present invention, the pharmaceutical composition may be administered in a dosage of about 1 to 100 µL/eye, preferably about 10 to 50 µL/eye and more preferably about 20 to 40 µL/eye. The pharmaceutical compositions may be administered about 1 to 20 times per day, preferably about 1 to 5 times per day and more preferably once per day.

EXAMPLES

The Examples which follow are set forth to aid in the understanding of the invention but are not intended to, and should not be construed to limit the scope of the invention in any way. The Examples do not include detailed descriptions of conventional methods. Such methods are well known to those of ordinary skill in the art.

Example 1—Binding of PP-001 to Albumin

For analysis of binding of PP-001 to HSA (human serum albumin) a rapid equilibrium dialysis (RED) assay from Thermo Scientific™ was conducted. Different PP-001 formulations were applied to the donor side of the device and 50 mM phosphate buffer pH 7.4 was used as acceptor medium. The time required to achieve equilibrium in the dialysis was determined to 5 hours. The formulations were incubated at 23° C. at 300 rpm. The unbound fraction was allowed to permeate through the dialysis membrane into the acceptor buffer chamber. After 5 hours equilibration time the unbound fraction was determined by analyzing the amount of PP-001 in each compartment via HPLC/DAD.

To investigate nonspecific binding of PP-001 to the RED Device Inserts, a solution of 0.05 mg/mL PP-001 in 50 mM phosphate buffer pH 7.4 was used as a control sample. PP-001 concentration in the acceptor compartment was >82% of the concentration in the donor compartment. Only minor non-specific binding of PP-001 to the RED device was determined.

Materials:
- RED: RED Device Inserts, 50/pack, Prod #89809 (Lot #1897071)
- Reusable Base Plate (Prod #No. 89811, Lot #NJ1617201) made of Teflon® Material
- Sealing Tape for 96-Well Plates (Prod #15036, Lot #NE171995)
- Incubation device: Eppendorf Thermomixer
- Sample containers: Eppendorf PP vials (1.5 and 2 mL)
- HPLC containers (G1), glass, 1.5 mL
- Centrifuge Hettich Mikro 220 R, max 14000 rpm Results:

The amount of free PP-001 was calculated according to the equation:

$$\% \text{ free} = \frac{PP\text{-}001 \text{ concentration acceptor chamber}}{PP\text{-}001 \text{ concentration donor chamber}} * 100\%$$

The amount of bound PP-001 is calculated as

% bound=100−% free

| Formulation | % free | % bound |
|---|---|---|
| 0.5 mg/mL PP-001 in 5% albumin | <0.2 | >99.8 |
| 3 mg/mL PP-001 in 5% albumin | 0.26 | 99.74 |
| 5 mg/mL PP-001 in 5% albumin | 0.48 | 99.52 |
| 10 mg/mL PP-001 in 5% albumin | 0.58 | 99.42 |

Even at high PP-001 concentrations, PP-001 is nearly completely bound to albumin in this assay.

Example 2—Formulation of PP-001/Albumin Eye Drops

PP-001 drug substance (150 mg) was suspended in a mixture of water (21.0 g) and 1 M aqueous NaOH (482 μL) and the mixture was stirred at 700 rpm over 0.5-3 hours at room temperature (20-25° C.), before 20% aqueous albumin solution (7.5 mL) was added. The agitation was continued for additional 1-2 hours at room temperature. pH and osmolality of the solution were adjusted to approximately 7.4 and 270-330 mOsm/kg respectively by a slow (dropwise) addition of 1 M aqueous HCl and 26% aqueous NaCl solution (575 μL). The yellowish almost clear mixture was stirred for additional 15 minutes before it was filtered using 0.2 μm sterile filters.

Figure 1:
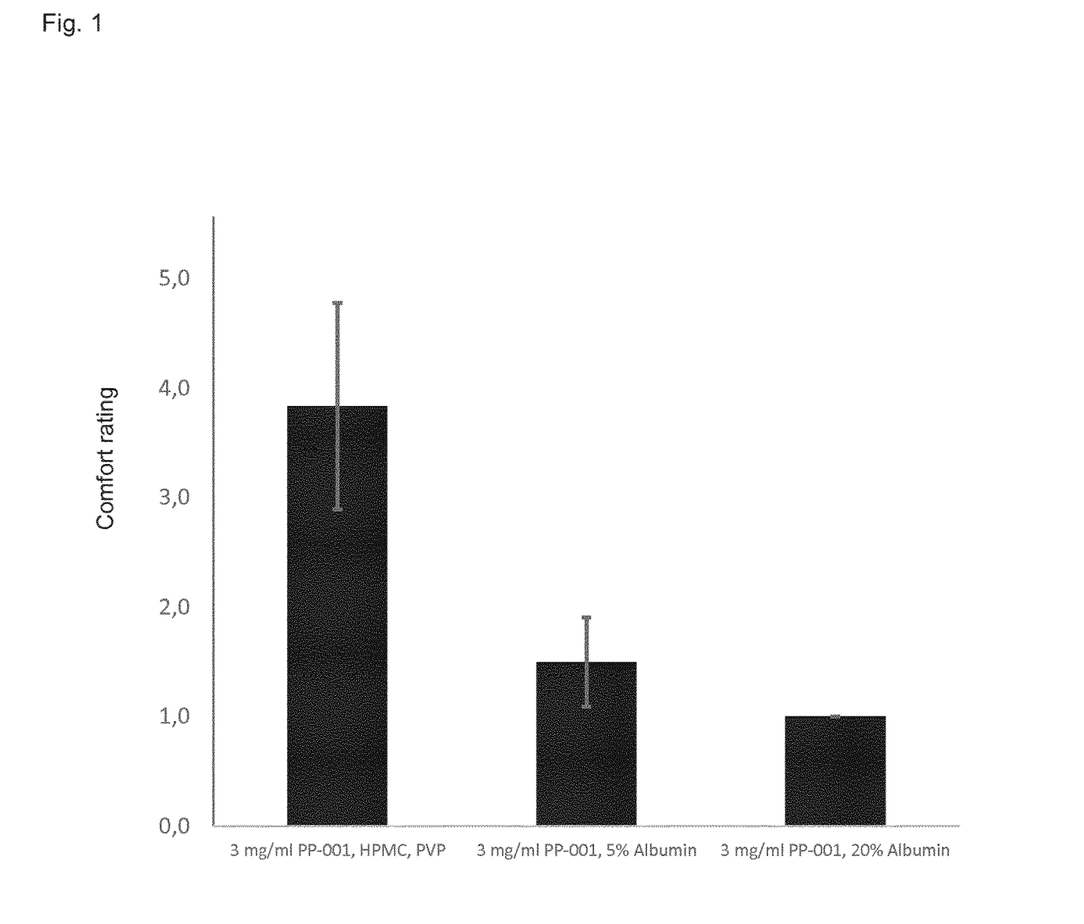
FIG. 1 depicts the evaluation of ocular comfort rating of different PP-001 formulations.

As shown in FIG. 1, the formulation comprising 3 mg/mL PP-001 and 50 mg/mL albumin is given excellent comfort rating from the tested patient group.

Example 3—Physico-Chemical Characterization of PP-001/Albumin Eye Drops as Prepared in Example 2 pH 7.39
276 mOsm/kg
>98% PP-001 binding to albumin

Example 4—Eye Irritation/Comfort Testing of PP-001/Albumin Eye Drops

Albumin containing eye drop formulations of PP-001 were compared to PP-001 eye drops which contain HPMC, PVP and glycerol as excipients and to commercially available cyclosporine eye drops (Ikervis®). One drop was applied to one eye. All formulations contained 3 mg/mL PP-001. Ikervis® contains 0.1% cyclosporine in an emulsion formulation. The comfort of different formulations was rated according to the following comfort score:
- 1: Comfortable (like isotonic saline)
- 2: Very mild temporary sensation
- 3: Mild burning or foreign sensation
- 4: Burning or stinging sensation
- 5: Strong burning or stinging sensation or redness While the formulation of PP-001 in HPMC, PVP and glycerol was rated as burning and stinging by the volunteers, formulations which contained 5% or 20% albumin were rated as comfortable and non-irritating to the eye. The same comfort rating (score 1) got all tested placebo formulations (data not shown). Ikervis® was found to be similarly burning as the PP-001 formulation which included HPMC, PVP and glycerol.

Example 5—PK Study in Rabbits

To confirm that PP-001/albumin formulations deliver sufficient PP-001 to target tissues (i.e. conjunctiva and cornea), a pharmacokinetic study was performed in New Zealand White rabbits.

Method:

10 female animals of ca. 3 months age were dosed one drop (35 μL drop size) of the formulation 1 (3 mg/ml PP-001) in both eyes at time point 0. Animals were sacrificed 5 or 30 minutes or 2, 4, or 12 hours after dosing and ocular tissues and plasma were collected. PP-001 concentration in plasma and tissues were determined by a validated HPLC-MS analytical method.

Figure 2:
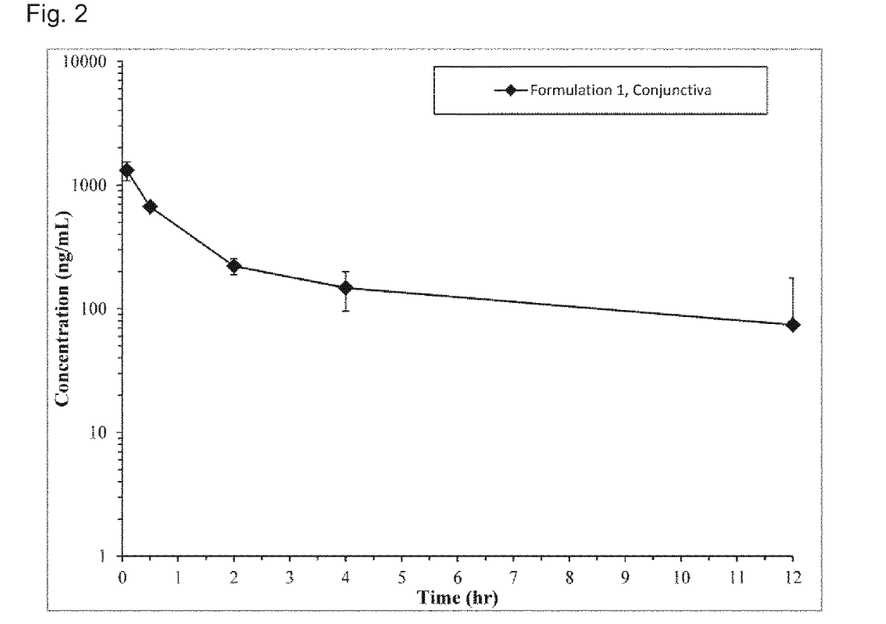
FIG. 2 depicts the average conjunctiva concentrations (ng/g) for PP-001 after topical administration in New Zealand White rabbits.
Figure 3:
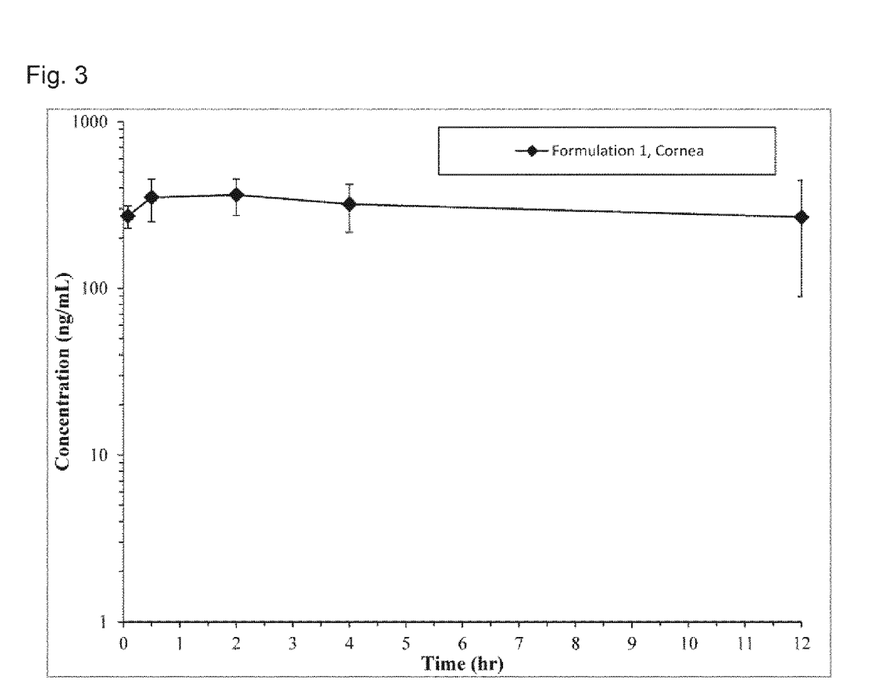
FIG. 3 depicts the average cornea concentrations (ng/g) for PP-001 after topical administration in New Zealand White rabbits.

Results:

The results are shown in FIGS. 2 and 3 for conjunctiva and cornea, respectively. Despite the high PP-001 fraction bound to albumin in the formulation (>95%) substantial amounts of PP-001 are absorbed by ocular tissues after administration of such eye drops.

PP-001 was highly persistent in the cornea, where concentrations did not decrease much from the $C_{max}$ by 12 hours after dosing. In plasma, $C_{max}$ was <9 ng/mL. Consequently, no systemic effects are expected by PP-001/albumin eye drops.

Example 6—Efficacy Study

Figure 4:
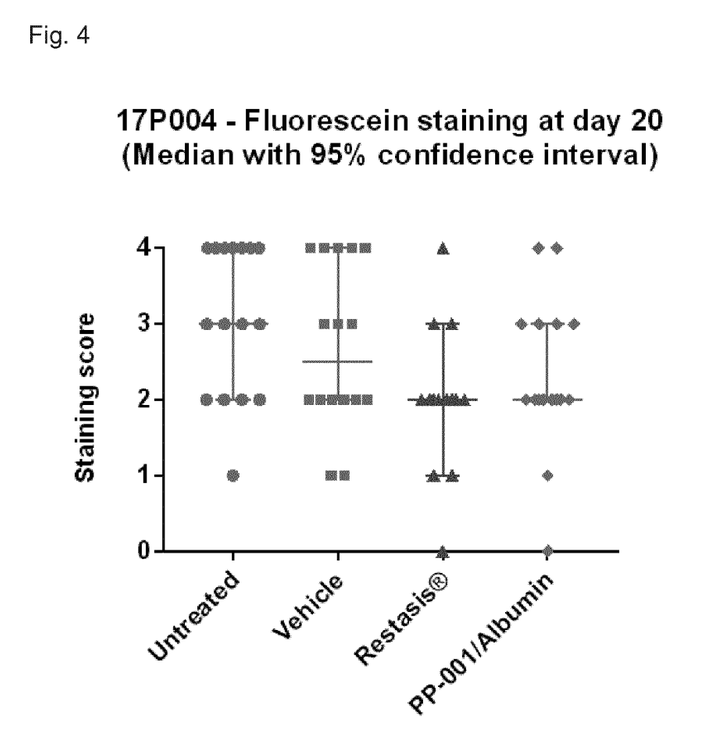
FIG. 4 depicts fluorescein staining at day 20 (median with 95% confidence interval) in a mouse dry eye model.
Figure 5:
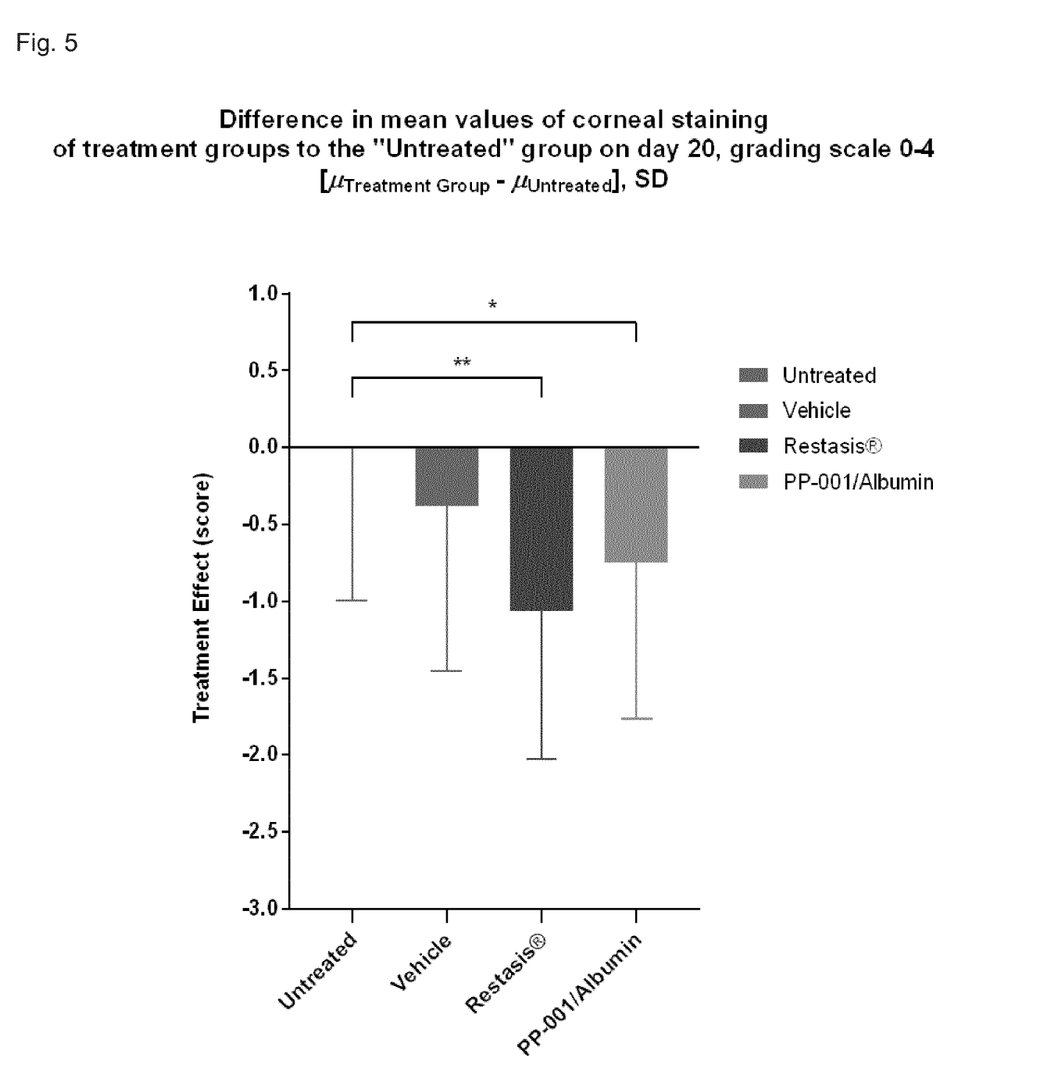
FIG. 5 depicts the difference in mean values of corneal staining of treatment groups to the "untreated" group on day 20 in a mouse dry eye model. Grading scale 0-4.

The objective of the efficacy study was to determine the anti-inflammatory and cytoprotective effects of PP-001 formulated in 5% HSA in a mouse dry-eye disease model. Efficacy was compared against the reference compound Restasis®.
Method:
Male C57BL/6 mice were exposed to a controlled desiccating environment with transdermal administration of scopolamine. On days 10 and 20, corneal fluorescein staining was assessed. Four groups (n=8 mice) were evaluated in the study. The groups included untreated and vehicle-treated animals, animals receiving 5 mg/mL PP-001/albumin formulation, or the reference compound Restasis®. Histological evaluation included quantification of conjunctival goblet cells, severity scoring of lacrimal gland pathology and corneal thickness measurements.
Results:
5 mg/mL PP-001 formulated in 5% HSA showed a statistically significant treatment effect in altering corneal fluorescein staining, which was comparable with the effect of Restasis® (see FIG. 4 and FIG. 5). A trend towards less lacrimal gland pathology was observed in the PP-001/albumin treatment group.

Example 7—Thermodynamic Solubility of Different Pharmaceutically Active Compounds Thermodynamic solubility of different pharmaceutically active compounds was determined in PBS (phosphate buffered saline) pH 7.4 and 5% of human serum albumin (HSA) in PBS. The process was initiated by adding 1 mL of defined buffer to about 1 mg of the solid compound. The solutions were mixed for at least 15 hours. If there was no undissolved substance in the solution visible, an additional portion of the solid compound was added and the solution was further mixed for at least 15 hours. This step was repeated until a saturated solution in equilibrium was achieved; excess solid was clearly visible. The total mixing time until equilibrium should exceed 40 hours. After reaching the equilibrium, the solutions were centrifuged for 10 minutes at 14,000 rpm. The supernatant was used for LC/MS analysis in order to define the content of active compounds in the saturated solution.
Materials:
  Analytical Balance: Radwag AS60/220/C/2 (accuracy: 0.1 mg)
  Sample containers, glass vials, 20 mL, Bionovo, (Prod #L-0323)
  HPLC containers, glass, 2 mL, Prod #VT009M-1232
  Eppendorf Centrifuge 5804 R
  Miscellaneous: Eppendorf tips, Eppendorf pipets, IKA KS 501 digital
LC-MS system:
  Degaser Ultimate 3000
  Pump Ultimate 3000 Pump
  Autosampler Ultimate 3000 RS autosampler
  Column oven Ultimate 3000 RS column compartment
  Detector Ultimate 3000 Photodiode Array Detector
  Mass spectrometer Bruker Daltonics amaZon SL
  Column: Agilent Technologies, Eclipse XDB-C18, 3.0× 75 mm, 3.5 µM, with precolumn
Results:

| Pharmaceutically active compound | Thermodynamic solubility in PBS pH 7.4 | Thermodynamic solubility in 5% HSA in PBS pH 7.4 | Increase in solubility |
|---|---|---|---|
| Azelastine HCl | 0.421 mg/mL | 0.827 mg/mL | 96% |
| Bimatoprost | 1.234 mg/mL | 3.006 mg/mL | 144% |
| Brinzolamide | 0.273 mg/mL | 0.387 mg/mL | 42% |
| Dipivefrin HCl | 2.342 mg/mL | 7.441 mg/mL | 218% |
| Fusidic Acid | 0.483 mg/mL | 1.421 mg/mL | 195% |
| Levocabastine HCl | 0.003 mg/mL | 0.083 mg/mL | 2,333% |
| Nepafenac | 0.009 mg/mL | 0.064 mg/mL | 619% |
| Netarsudil mesylate | <0.000051 mg/mL | 0.140 mg/mL | >10,000% |
| PP-001 | 0.048 mg/mL | 2.909 mg/mL | 5,978% |
| Prednisolone acetate | 0.007 mg/mL | 0.019 mg/mL | 176% |

Figure 6:
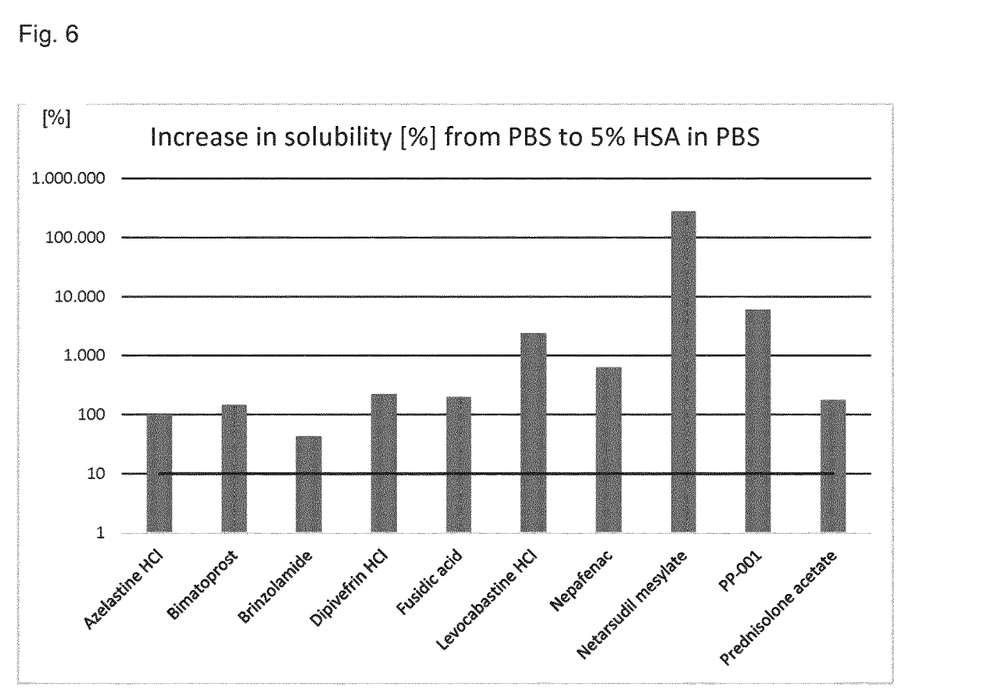
FIG. 6 depicts the increase in solubility [%] from PBS to 5% HSA in PBS.

The aqueous solubility in PBS pH 7.4 only was defined as 100% (see FIG. 6). The percentage increase of the thermodynamic solubility (y-axis in the graph), when using 5% HSA in PBS as buffer, was calculated according to the following equation:

$$\% \text{ increase} = \frac{\text{solubility in 5\% HSA in PBS}}{\text{solubility in PBS}} * 100\% - 100\%$$

An increase by at least 10% (drawn line in the graph) in the presence of albumin when compared to the aqueous solubility of the pharmaceutically active compound alone was reached for all tested compounds. The highest increase in solubility could be shown for netarsudil mesylate (>274, 763%), PP-001 (5,978%) and levocabastine HCl (2,333%).

Example 8—Binding of Different Pharmaceutically Active Compounds to Albumin

For analysis of binding of different pharmaceutically active compounds to HSA (human serum albumin) a rapid equilibrium dialysis (RED) assay from Thermo Scientific™ was conducted. Different pharmaceutically active compounds (in saturated solutions as prepared in Example 1) were applied to the donor side of the device. PBS pH 7.4 was used as acceptor medium. The time required to achieve equilibrium in the dialysis was determined to 5 hours. The formulations were incubated at 23° C. at 300 rpm. The unbound fraction was allowed to permeate through the dialysis membrane into the acceptor buffer chamber. After 5 hours equilibration time, the unbound fraction was determined by analyzing the amount of the active compound in each compartment via LC/MS.
Materials:
  RED: RED Device Inserts, 50/pack, Prod #89809 (Lot #T12635252)
  Reusable Base Plate (Prod #89811) made of Teflon® Material
  Sealing Tape PerkinElmer (Prod #1450-461, Lot #875-15081)
  Incubation device: Eppendorf Thermomixer
  Sample containers, glass vials, 20 mL, Bionovo, (Prod #L-0323)
  HPLC containers, glass, 2 mL, Prod #VT009M-1232

Eppendorf Centrifuge 5804 R
LC-MS system:
Degaser Ultimate 3000
Pump Ultimate 3000 Pump
Autosampler Ultimate 3000 RS autosampler
Column oven Ultimate 3000 RS column compartment
Detector Ultimate 3000 Photodiode Array Detector
Mass spectrometer Bruker Daltonics amaZon SL
Column: Agilent Technologies, Eclipse XDB-C18, 3.0× 75 mm, 3.5 μM, with precolumn Results:

The amount of free compound was calculated according to the equation:

$$\% \text{ free} = \frac{\text{concentration of compound in acceptor chamber}}{\text{concentration of compound in donor chamber}} * 100\%$$

The amount of bound compound is calculated as % bound=100−% free

| Pharmaceutically active compound | % free | % bound |
|---|---|---|
| Azelastine HCl | 19.1 | 80.9 |
| Bimatoprost | 22.4 | 77.6 |
| Brinzolamide | 29.7 | 70.3 |
| Dipivefrin HCl | 35.2 | 64.8 |
| Fusidic acid | 4.3 | 95.7 |
| Levocabastine HCl | 24.6 | 75.4 |
| Nepafenac | 7.9 | 92.1 |
| Netarsudil mesylate | 0.0 | 100.0 |
| PP-001 | 0.1 | 99.9 |
| Prednisolone acetate | 5.7 | 94.3 |

Figure 7:
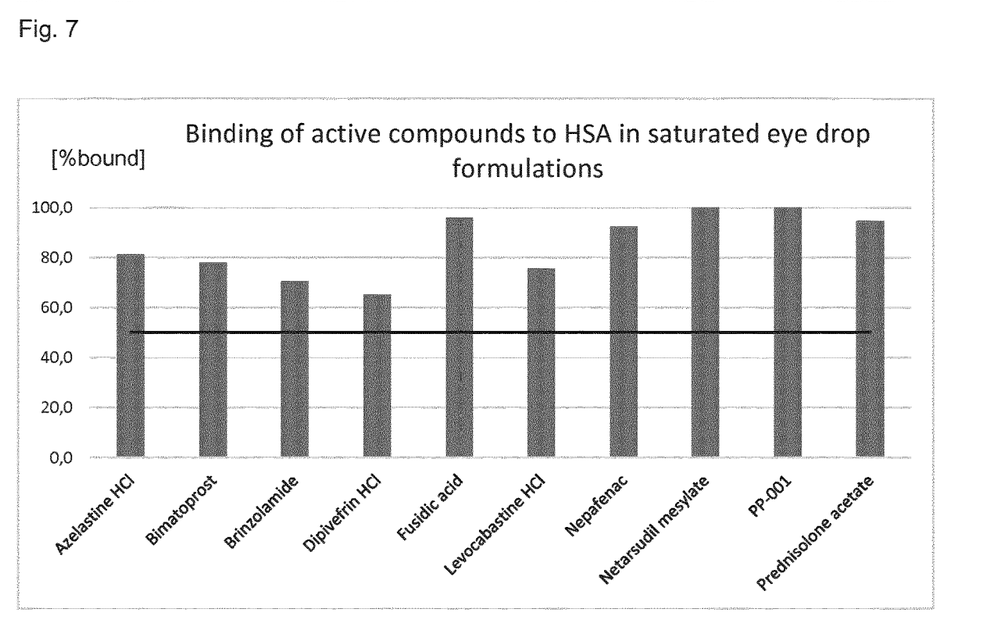
FIG. 7 depicts binding of active compounds to HSA in saturated eye drop formulations.

The graph shows the percentage of each compound which is non-covalently bound to human serum albumin in saturated solutions of 5% HSA (see FIG. 7). All tested compounds are non-covalently bound to HSA to more than 65%.

Netarsudil mesylate and PP-001 are almost 100% bound to HSA in saturated solutions. The drawn line clearly indicates that more than 50% of the pharmaceutically active compounds are bound to albumin.

The invention claimed is:

1. An ophthalmic composition comprising 3-(2,3,5,6-tetrafluoro-3'trifluoromethoxy-biphenyl-4-ylcarbamoyl)-thiophene-2-carboxylic acid (PP-001) as an ophthalmic pharmaceutically active compound and albumin, wherein the ophthalmic composition is in the form of an eye drop.

2. The ophthalmic composition of claim 1, wherein said albumin is human serum albumin, recombinant human serum albumin, serum albumin that has at least a one amino acid truncation at its N-terminal end, or prealbumin.

3. The ophthalmic composition of claim 1, further comprising one or more pharmaceutically acceptable excipients and/or carriers.

4. The ophthalmic composition of claim 1, wherein the pharmaceutically acceptable excipient is selected from the group consisting of surfactants, preservatives, viscosity regulators, pH-adjusting agents, stabilizers, and tonicity-regulators.

5. The ophthalmic composition of claim 1, wherein the pharmaceutically active compound is comprised from about 0.005% to about 20% by weight.

6. The ophthalmic composition of claim 1, wherein albumin is comprised from about 1% to about 30% by weight.

7. The ophthalmic composition of claim 1, wherein the weight ratio of albumin to the pharmaceutically active compound in the ophthalmic composition is about 1:5, or 1:1, or 20:1, or 400:1, or more.

8. The ophthalmic composition of claim 1, wherein the ophthalmic composition is for topical ocular instillation.

9. A method for treatment of a patient suffering from dry eye syndrome, post-cataract surgery, glaucoma, conjunctivitis, allergy, bacterial infection, blepharitis, infectious corneal ulcers, corneal abrasions, ocular inflammation, corneal transplants, or uveitis, comprising administering to the patient the ophthalmic composition of claim 1.

10. The method of claim 9, wherein the dry eye syndrome is aqueous tear-deficient dry eye or evaporative dry eye.

11. The method of claim 9, wherein the dry eye syndrome eye is selected from the group consisting of alacrima, xerophthalmia, Sjogren syndrome, dry keratoconjunctivitis, Stevens-Johnson syndrome, ocular pemphigoid, dry eye after ophthalmic operation, dry eye accompanied with allergic conjunctivitis, dry eye like conditions including tear decrement of VDT (Visual Display Terminal) worker and tear decrement without any systemic symptom caused by dry room due to air conditioning.

12. The ophthalmic composition of claim 2, wherein said albumin is human serum albumin.

* * * * *